(12) United States Patent
Wisecarver

(10) Patent No.: US 6,854,551 B2
(45) Date of Patent: Feb. 15, 2005

(54) COLLAPSIBLE VEHICLE

(76) Inventor: Warren R. Wisecarver, c/o Bishop-Wisecarver Corporation P.O. Box 1109, Pittsburg, CA (US) 94565

( * ) Notice: Subject to any disclaimer, the term of this patent is extended or adjusted under 35 U.S.C. 154(b) by 55 days.

(21) Appl. No.: 10/100,267

(22) Filed: Mar. 14, 2002

(65) Prior Publication Data

US 2002/0139591 A1 Oct. 3, 2002

Related U.S. Application Data

(63) Continuation-in-part of application No. 09/668,063, filed on Sep. 25, 2000, now Pat. No. 6,371,235.

(51) Int. Cl.$^7$ .............................................. B63D 61/00
(52) U.S. Cl. ...................... 180/208; 180/211; 280/639; 280/43
(58) Field of Search .............................. 280/43.15, 639, 280/37, 38, 39, 641, 642, 14, 28, 43; 180/908, 208, 210, 211, 212, 213, 214, 65.1, 65.5

(56) References Cited

U.S. PATENT DOCUMENTS

| | | | | |
|---|---|---|---|---|
| 2,696,272 A | * | 12/1954 | Schlaphoff | .................. 180/208 |
| 2,812,949 A | * | 11/1957 | Munro | |
| 2,975,850 A | * | 3/1961 | Dolphin | ...................... 180/348 |
| 3,004,619 A | | 10/1961 | Straussler | |
| 3,213,957 A | | 10/1965 | Wrigley | |
| 3,354,975 A | | 11/1967 | Stuart | |
| 3,369,629 A | | 2/1968 | Weiss | |
| 3,417,834 A | * | 12/1968 | Smith | .......................... 180/208 |
| 3,434,558 A | | 3/1969 | Allen | |
| 3,580,348 A | | 5/1971 | Di Blasi | |
| 3,580,349 A | | 5/1971 | Brennan | |
| 3,589,745 A | | 6/1971 | Dougherty | |
| 3,605,929 A | | 9/1971 | Rolland | |
| 3,700,057 A | * | 10/1972 | Boyd et al. | .................. 180/308 |
| 3,710,883 A | * | 1/1973 | Rizzo | .......................... 180/208 |
| 3,770,289 A | * | 11/1973 | Dougherty et al. | ......... 280/639 |
| 3,797,597 A | | 3/1974 | Young | |
| 3,887,218 A | | 6/1975 | Di Blasi | |
| 4,087,108 A | | 5/1978 | Winchell | |
| 4,340,124 A | * | 7/1982 | Leonard | ...................... 180/208 |
| 4,700,962 A | | 10/1987 | Salmon | |
| 4,761,012 A | | 8/1988 | Dames | |
| 4,844,494 A | | 7/1989 | Blanchard | |
| 5,097,922 A | * | 3/1992 | Stagi | .......................... 180/208 |
| 5,697,464 A | * | 12/1997 | Gojak | .......................... 180/21 |
| 6,100,615 A | * | 8/2000 | Birkestrand | ............ 180/65.5 X |
| 6,371,235 B1 | * | 4/2002 | Wisecarver | ................. 180/208 |
| 6,607,207 B2 | * | 8/2003 | Shapiro et al. | ............. 280/287 |

FOREIGN PATENT DOCUMENTS

| | | | |
|---|---|---|---|
| AU | 138840 | | 9/1948 |
| DE | 4135868 | * | 5/1992 |
| GB | 619348 | | 3/1949 |

* cited by examiner

Primary Examiner—Bryan Fischmann
(74) Attorney, Agent, or Firm—Dorsey & Whitney LLP

(57) ABSTRACT

A collapsible vehicle having a frame, a non-steerable wheel assembly and a steerable wheel assembly. The frame includes a longitudinal member, a transverse member, an upright member proximal to one end of the longitudinal member, and a steering member proximal to another end of the longitudinal member. The longitudinal member and the transverse member define a base plane. The non-steerable wheel assembly which preferably includes two non-steerable wheels pivotable about an inclined axes between a storage position within the periphery of the frame to a deployed position outside the periphery of the frame and extending below the base plane. The steerable wheel assembly includes a steerable wheel pivotable about an inclined steering axis between a storage position within the periphery of the frame to a deployed position outside the periphery of the frame and extending below the base plane. A method of collapsing and extending the collapsible vehicle is also disclosed.

22 Claims, 13 Drawing Sheets

COLLAPSIBLE VEHICLE

RELATED APPLICATIONS

This application is a Continuation-in-Part of U.S. patent application Ser. No. 09/668,063 filed Sep. 25, 2000, entitled COLLAPSIBLE VEHICLE and now U.S. Pat. No. 6,371,235, the entire contents of which is incorporated herein by this reference.

BACKGROUND OF THE INVENTION

1. Field of the Invention

This invention relates to a new and improved collapsible vehicle, and more particularly, to a collapsible vehicle having a frame and steerable and non-steerable wheels which are movable between storage positions within the periphery of the frame and deployed positions outside the periphery of the frame.

2. Description of Related Art

Personal electric scooters have been widely used to assist people who have disabilities or limited energy in enabling the user to be mobile, particularly in urban environments. One of the problems of prior art electric scooters has been that they are sufficiently bulky so that transport of the scooters from one location to another by means of an automobile, sport-utility vehicle or aircraft is difficult and unwieldy.

Collapsible vehicles which fold to reduce the overall dimensions for transporting and storing are known. An exemplar of such prior art vehicles is U.S. Pat. No. 3,580,348 to Di Blasi which shows a collapsible frame which folds about transversely oriented pins.

Disadvantageously, such a vehicle remains bulky in its folded configuration because the width of the vehicle remains the same in both its folded and use configurations. Furthermore, lifting and handling such a prior art vehicle in its folded configuration is difficult and unwieldy because the entire weight of the vehicle, including its fuel or batteries, remains attached thereto.

SUMMARY OF THE INVENTION

In summary, one aspect of the present invention is directed to a collapsible vehicle having a frame, a non-steerable wheel assembly and a steerable wheel assembly. The frame includes a longitudinal member, a transverse member, an upright member proximal to one end of the longitudinal member, and a steering member proximal to another end of the longitudinal member. The longitudinal member and the transverse member define a base plane. The non-steerable wheel assembly includes a non-steerable-wheel pivotable about a single axis between a storage position within the periphery of the frame to a deployed position outside the periphery of the frame and extending below the base plane. The steerable wheel assembly includes a steerable wheel movable between a storage position within the periphery of the frame to a deployed position outside the periphery of the frame and extending below the base plane. A method of using the collapsible vehicle is also disclosed.

An object of the present invention is to provide a collapsible vehicle which easily collapses to a storage configuration having reduced longitudinal and lateral dimensions.

Yet another object of the present invention is to provide a collapsible vehicle having wheels which collapse within the periphery of the frame pivot wherein each wheel is pivotable about a single respective axis between storage and deployed positions.

It is another object of the present invention to provide a collapsible vehicle having removable components which may be easily disengaged from a frame of the collapsible vehicle.

The collapsible vehicle of the present invention has other features and advantages which will be apparent from or are set forth in more detail in the accompanying drawings, which are incorporated in and form a part of this specification, and the following Detailed Description of the Invention, which together serve to explain the principles of the present invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
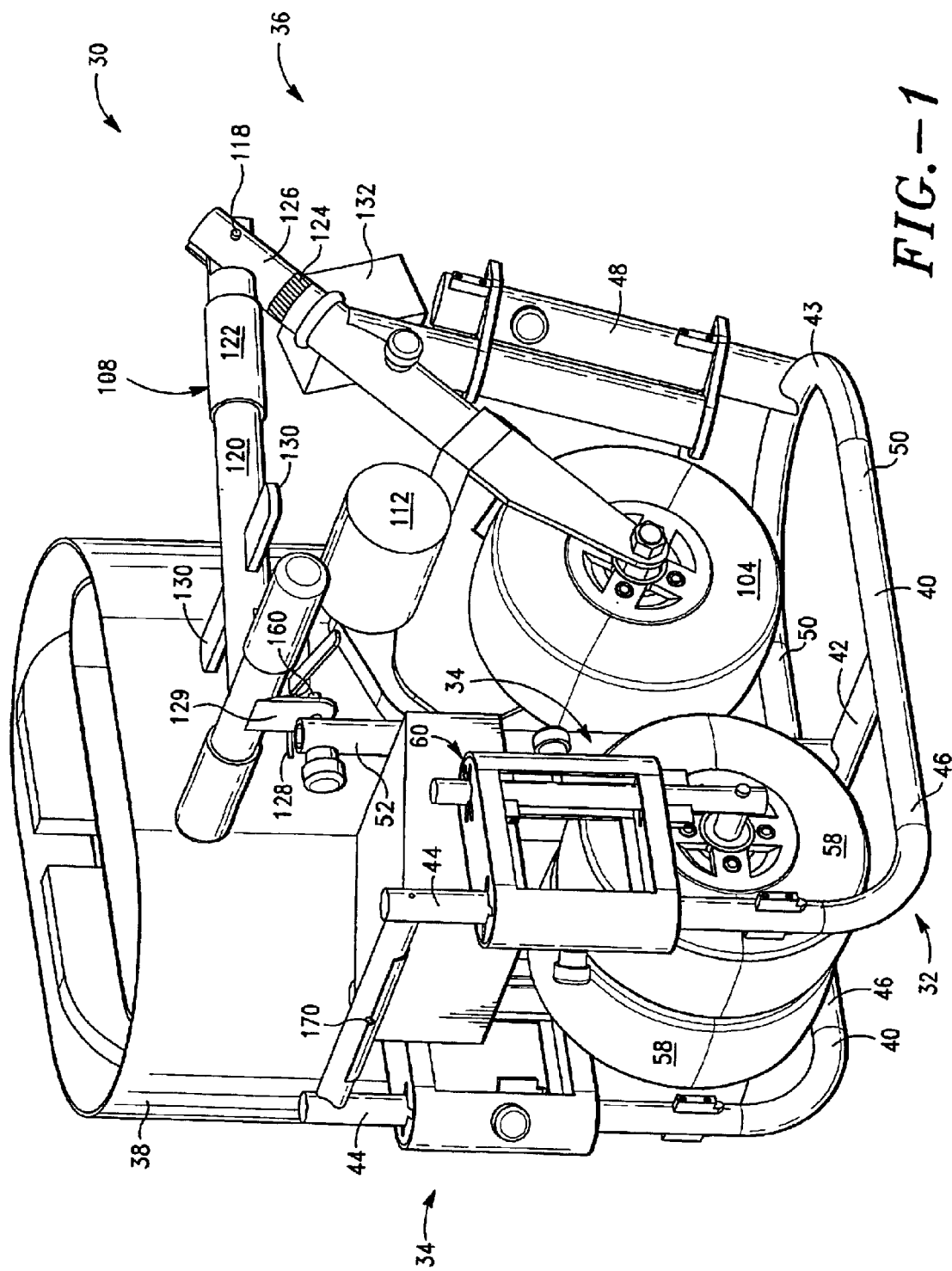
FIG. 1 is a perspective view of a collapsible vehicle in accordance with the present invention in a collapsed configuration.

Turning now to the drawings, wherein like components are designated by like reference numerals throughout the various figures, attention is directed to FIG. 1. A collapsible vehicle 30 in accordance with the present invention includes a frame 32, a pair of non-steerable wheel assemblies 34, a steerable wheel assembly 36, and various components which are disengaged from the frame 32 and stored in a carrying bag 38. The wheel assemblies of the present invention are such that each wheel is movable between a storage position within the periphery of the frame and a deployed position outside of the periphery of the frame and extending below the frame.

Frame 32 includes a pair of parallel longitudinal members 40 which are interconnected by transverse members 42 and 43. An upright member 44 extends upwardly adjacent to a rearward end 46 of each longitudinal member 40. A steering member 48 extends upwardly from a transverse member 43 proximal to a forward end 50 of longitudinal member 40. A seat post 52 extends upwardly from a transverse member intermediate the steering member 48 and the upright members 44. Although the upright members 44 and the seat post 52 are shown to be substantially vertical or perpendicular to the longitudinal members, one should appreciate that the upright members and the seat post may extend at an inclined angle with respect to the longitudinal members and fall within the scope of the present invention. Similarly, one should appreciate that the steering member may extend substantially vertically within the scope of the present invention. Preferably, however, the steering member extends at an angle of approximately 15° from vertical, as discussed below.

The illustrated frame is formed of metal tubes and metal plates. One should appreciate, however, that the frame may be made of variously shaped members including channel steel, I-beams, angle-iron, and other suitable members having other geometries. Furthermore, one should appreciate that the frame may by formed of various materials including steel, aluminum, and other suitable alloys, as well as plastic and composite materials having sufficient strength and weight. For example, the frame may have a composite shell having openings which allow wheels to move between storage and deployed positions, as discussed below.

The frame has a substantially box-shaped periphery. In particular, the longitudinal member 40 and transverse members 42 and 43 collectively define a base plane extending therethrough, and more particularly, a rectangular base which is substantially smaller than the track and wheelbase of the vehicle. The upright members 44 and the steering member 48, extend upward from the rectangular base and define the depth of the box-shaped periphery. As the vehicle of the present invention collapses into a configuration suitable for storage and transporting, all wheels of the vehicle are moved to a respective storage position which is located within the periphery of the frame 32 and above the base plane. Namely, the wheels are moved within the external confines of the extremes of the frame 32. As the vehicle of the present invention is converted to an extended, ready-for-use configuration, the wheels are moved from their storage positions to respective deployed positions outside of the frame periphery and extend below the base plane. In particular, the wheels are moved external to the confines of the frame.

One should appreciate that the periphery of the frame may have various shapes in accordance with the present invention. For example, the longitudinal members and the transverse members may form a triangular base or a circular base whereby the frame has a substantially wedge-like or cylindrical shape. In either case, the wheels are moveable to storage positions which are located internal to the outer confines of the wedge-like or cylindrical shape.

Figure 2:
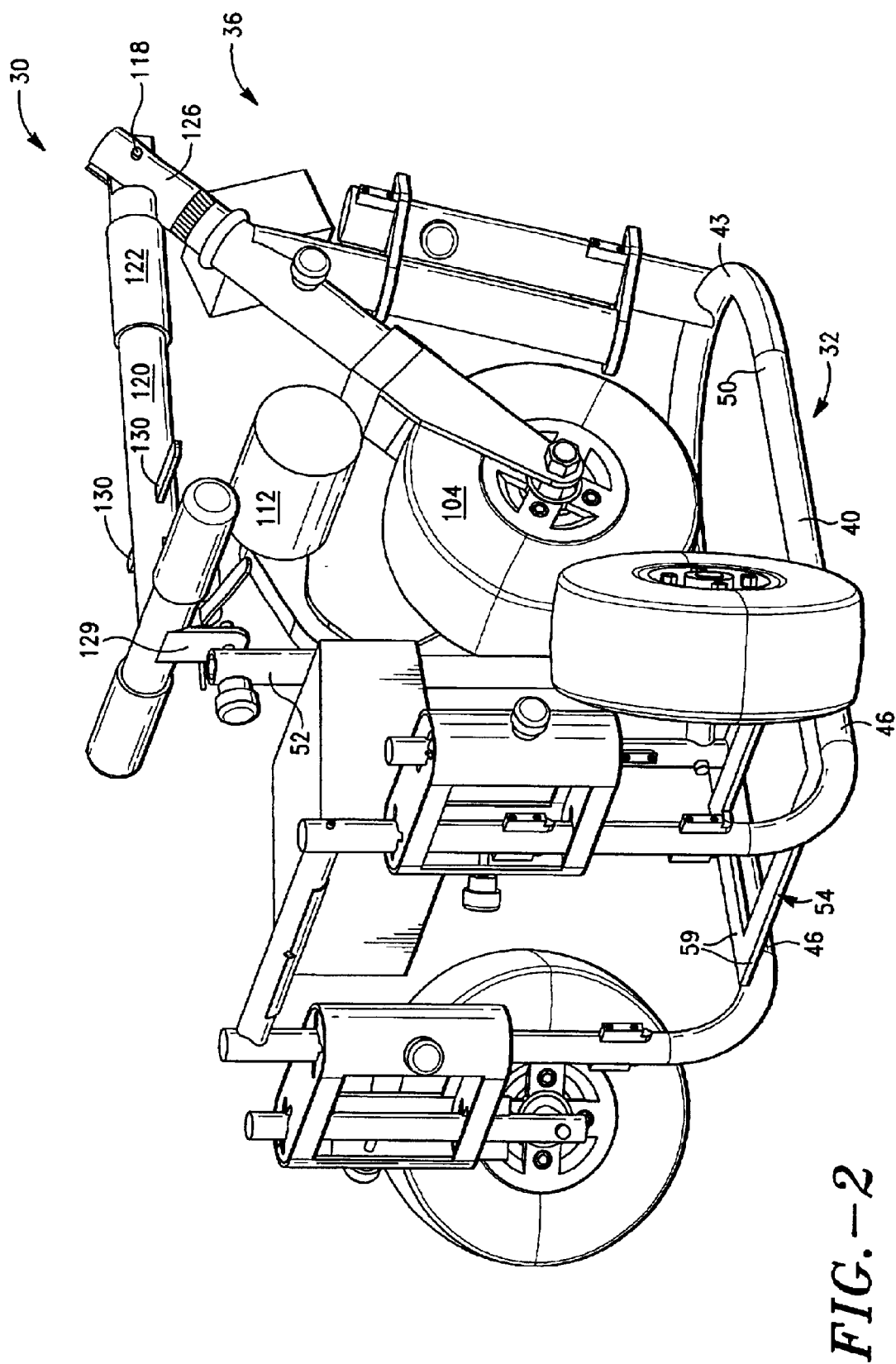
FIG. 2 is a perspective view of the collapsible vehicle of FIG. 1 having rear wheel assemblies located in an intermediate position.
Figure 3:
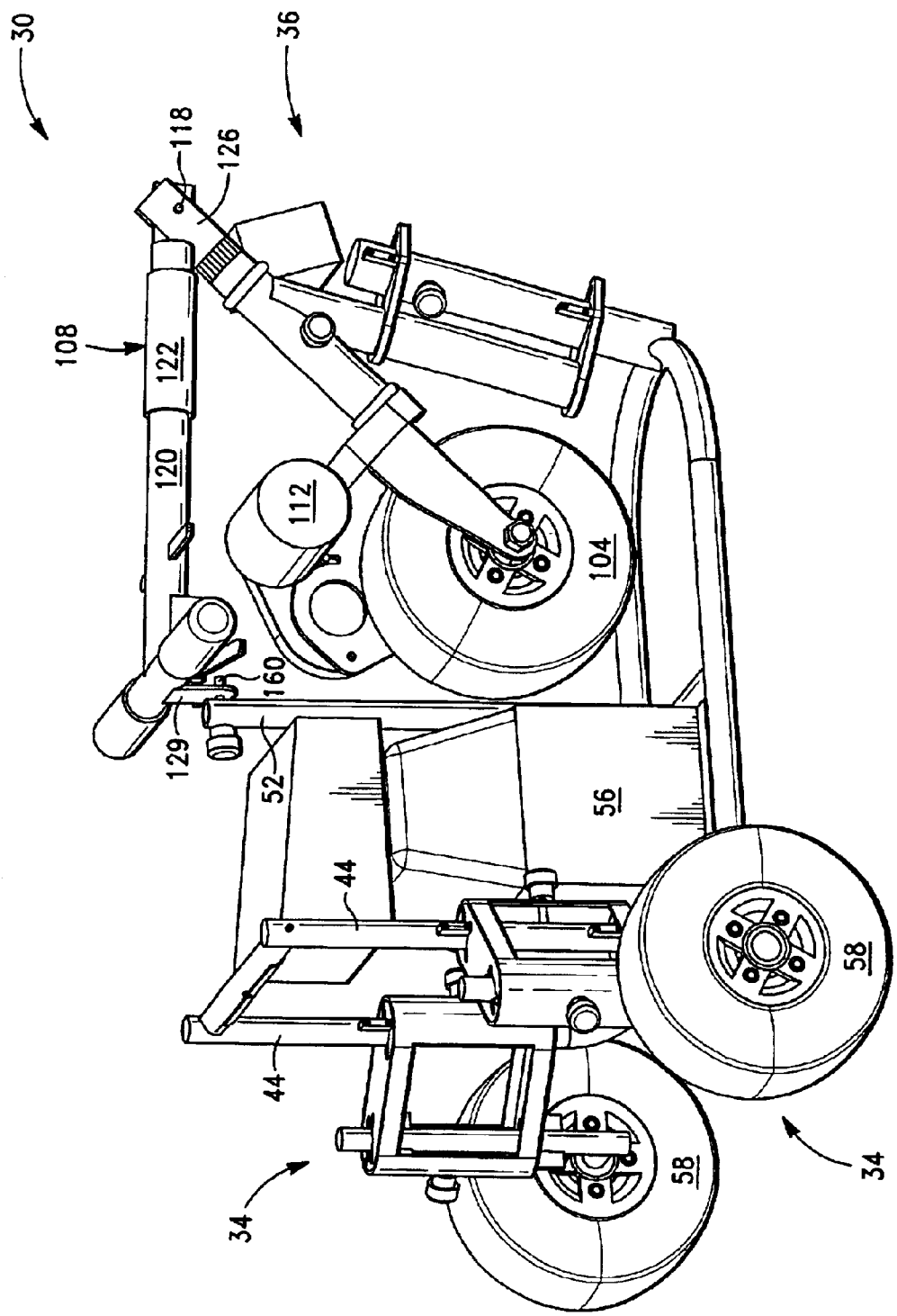
FIG. 3 is a perspective view of the collapsible vehicle of FIG. 1 showing the rear wheel assemblies located in a deployed position.

The frame includes a battery box or mount 54 located between the upright members 44 and the seat post 52, as is shown in FIG. 2. A battery 56 (shown in FIG. 3) is removed from the frame 32 when the collapsible vehicle 30 is in its collapsed configuration allowing rear wheels 58 to be stored within in the periphery of the frame 32, as is shown in FIG. 1. However, once the rear wheels 58 have been moved to their deployed position, battery 56 may be placed on the battery box 54 and secured to the frame 32, as is shown in FIG. 3. The battery mount 54 includes flanges 59 which, together with the weight of the battery 56, serve to hold the battery in place. One should appreciate that the battery 56 may be additionally secured to the frame 32 with threaded fasteners, spring clips, and other suitable means (not shown).

Referring to FIGS. 1–3, the collapsible vehicle of the present invention includes a pair of rear non-steerable wheel assemblies 34. Although two rear wheel assemblies are shown, one should appreciate that one, two, three or more rear wheel assemblies may be provided within the scope of the present invention. Each rear wheel assembly 34 is movable between a storage position which is within the periphery of the frame 32, as shown in FIG. 1, and an intermediate position, as shown in FIG. 2. Each rear wheel assembly is also movable between the intermediate position and a deployed position, as shown in FIG. 3.

Figure 4:
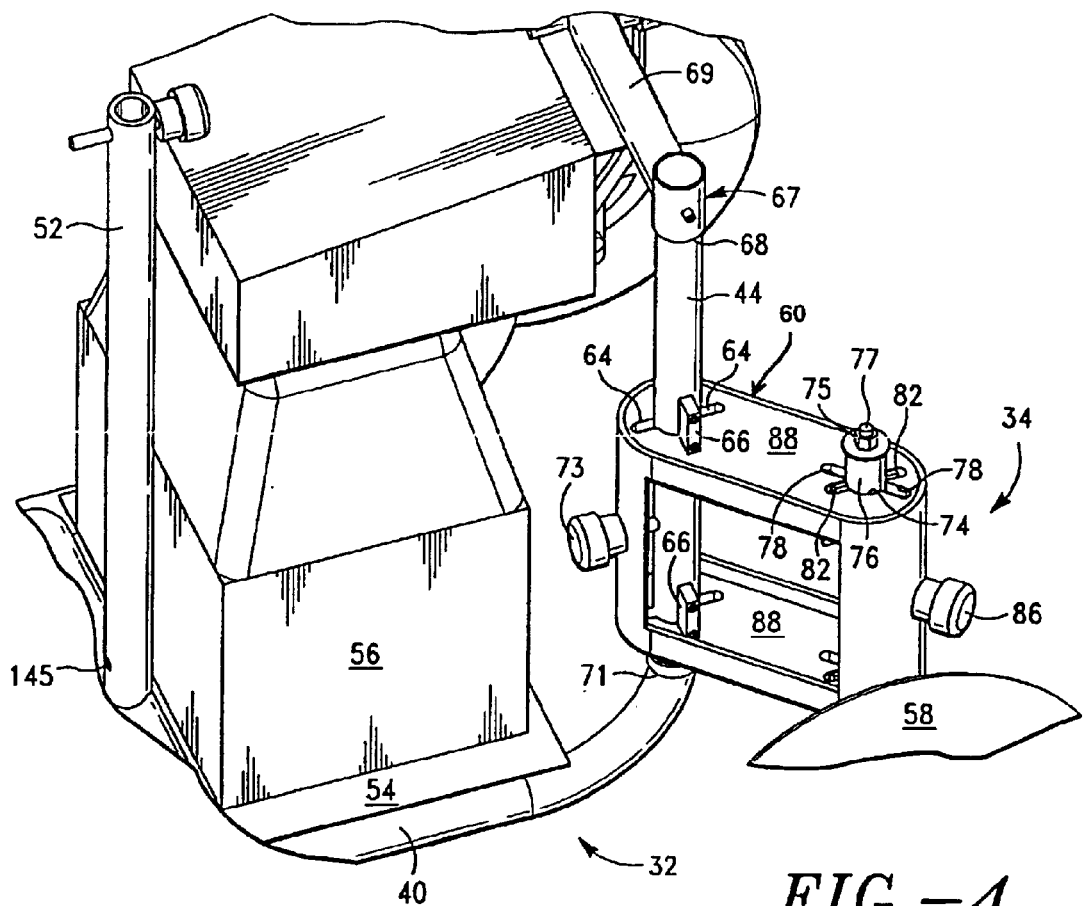
FIG. 4 is an enlarged fragmented view of a rear portion of the collapsible vehicle of FIG. 1 showing details of one rear wheel assembly.
Figure 5:
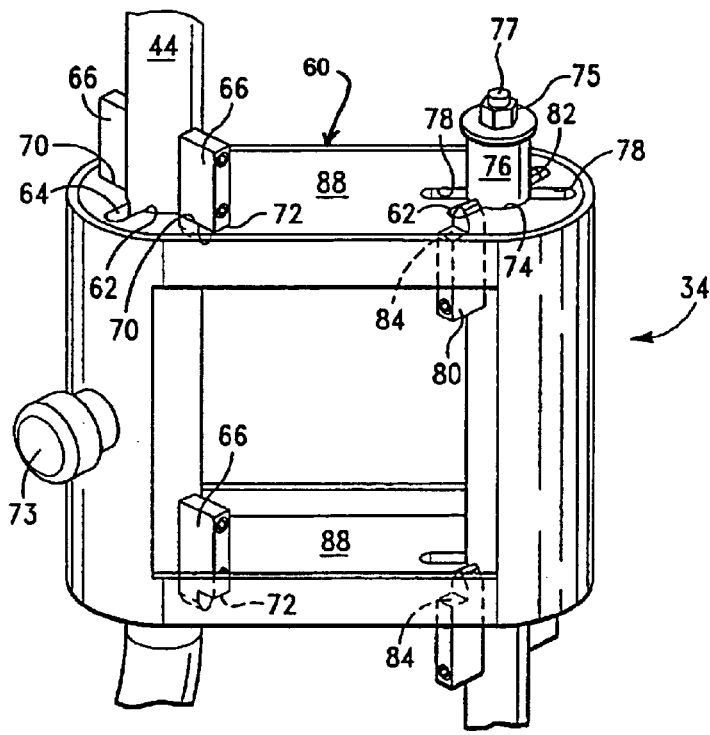
FIG. 5 is an enlarged fragmented view of an indexing member of the rear wheel assembly of FIG. 4.

As shown in FIGS. 4 and 5, each rear wheel assembly 34 includes a rear indexing member 60 which is pivotally and slidably mounted on a respective upright member 44. The rear indexing member 60 has a first bore 62 receiving the upright member 44 and a plurality of slots radially extending from the first bore 62. A pair of passage slots 64 allows the rear indexing member 60 to slide along the upright member 44 past a pair of keys 66 located on the upright member 44. The range of upward axial movement of the rear indexing member 60 along the upright member 44 is limited by a pair of collars 67, as shown in FIG. 4. The collar 67 is formed by a tubular collar member 68 provided on each opposing end of upper transverse member 69, only one of which is shown in FIG. 1. Each tubular collar member 68 is dimensioned to receive an upper end of a respective upright member 44 and is releasably secured thereto by a threaded fastener or other suitable means. This configuration allows easy assembly and removal of the rear wheel assemblies 34 from the frame 32. The range of downward axial movement of the rear indexing member 60 is limited by lower collar 71 in the form of a protrusion provided on the lower end of the upright member 44.

The rear indexing member 60 also includes a pair of shorter slots 70 which radially extend from the first bore 62. As the rear indexing member 60 is slid below the keys 66, the rear indexing member 60 may be aligned such that the shorter slots 70 align with the keys 66. Because the shorter slots 70 are shorter than the keys 66, the rear indexing member 60 engages a shoulder 72 which is located on the bottom of each key 66. This configuration allows the keys 66 to support the weight of the collapsible vehicle 30 and a user when the rear wheels 58 are located in their deployed position. The rear indexing member 60 also includes a first locking pin assembly 73 for axially locking the rear wheel assembly 34 relative to the upright member 44 when it is in its deployed position to prevent the rear indexing member 60 from falling away from and disengaging shoulder 74. The first locking pin assembly 73 is also used to lock the rear wheel assembly 34 relative to the frame 32 when the rear wheel 58 is located in its storage position.

It is noted that the keys 66 support the entire weight of the collapsible vehicle 20 and a user when the rear wheels 58 are located in their deployed position instead of the locking pin assembly 73. Thus, the locking pin assembly 73 of the illustrated embodiment does not carry any load of the collapsible vehicle and a user when the rear wheels are located in their deployed position.

On should appreciate, however, that the upright members of the collapsible vehicle may be provided with indexing holes instead of the keys 66 in which case the locking pin assembly would be used to lock the rear wheel assembly 34 relative to frame 32 when the rear wheel 58 is located in its deployed position as well as when it is located in its storage position. In the case that indexing holes are used instead of keys, it is the locking pin assembly that carries the load of the collapsible vehicle when the rear wheels are located in their deployed position.

As shown in FIGS. 4 and 5, the rear indexing member 60 is provided with a second bore 74 for pivotally and slidably receiving an upwardly extending axle member 76 upon which the rear wheel 58 is rotatably mounted. A nut and washer assembly prevents the axle member 76 from sliding out of the second bore 74 and disengaging the rear indexing member 60. In particular, a washer is held in place by a nut 75 threadably engaged with a threaded member 77 which extends upwardly from axle member 76. This configuration allows easy assembly and disassembly of the axle member 76 from indexing member 60. One should appreciate that other suitable means such as a cotter pin or other suitable means can be used to prevent the axle member 76 from disengaging the rear indexing member 60.

The second bore 74 also includes a plurality of slots radially extending therefrom. A second pair of passage slots 78 allows the axle member 76 to slide axially with respect to the rear indexing member 60 past a pair of second keys 80 mounted on the axle member 76. A second pair of shorter slots 82 which may be aligned such that the second shorter slots 82 are aligned with the second keys 80 located on the axle member 76 and the rear indexing member 60 engages second shoulders 84 located on the tops of the second keys 80. This configuration likewise allows the second keys 80 to support the weight of the collapsible vehicle 30 and a user when the rear wheels 58 are in their deployed position.

The rear indexing member 60 also includes a second locking pin assembly 86 for locking the axle member 76 to the rear indexing member 60 in the same manner that the first locking pin assembly 73 locks the rear indexing member 60 to upright member 44. One should appreciate that a set screw, cotter pin, or other suitable means may be provided to lock the rear wheel assemblies and the rear axle members in their respective storage positions.

Similar to the locking pin assembly 73 discussed above, the second locking pin assembly 86 does not support the weight of the collapsible vehicle 20 and a user when the rear wheels 58 are located in their deployed position. The second locking pin merely locks the axle member 76 relative to the rear indexing member 60 when the rear wheels are located in their deployed position. The second keys 80 support the weight of the collapsible vehicle 20 and a user when the rear wheels 58 are located in their deployed position instead of the locking pin assembly 73, in the same manner as discussed above with reference to keys 66.

On should appreciate, however, that the axle members of the collapsible vehicle may also be provided with second indexing holes instead of the second keys 80 in which case the second locking pin assembly would be used to lock the axle member 76 relative to the rear wheel assembly 34 when the rear wheel 58 is located in its deployed position as well as when it is located in its storage position. In the case that second indexing holes are used instead of keys, it is the second locking pin assembly that carries the load of the collapsible vehicle when the rear wheels are located in their deployed position.

The rear indexing member of the illustrated embodiment includes a pair of parallel mounting plates 88 which cooperate with upper and lower sets of first keys 66 provided on each upright member 44. One should appreciate that other configurations may be used. For example, a single, solid mounting plate may be provided with sufficient thickness to prevent the wheel assembly from unwanted play with respect to the upright members. Alternatively, one should appreciate that keys may be provided on the wheel assembly and keyways may be provided on the upright member to properly index the wheel assembly with respect to the frame.

Figure 6:
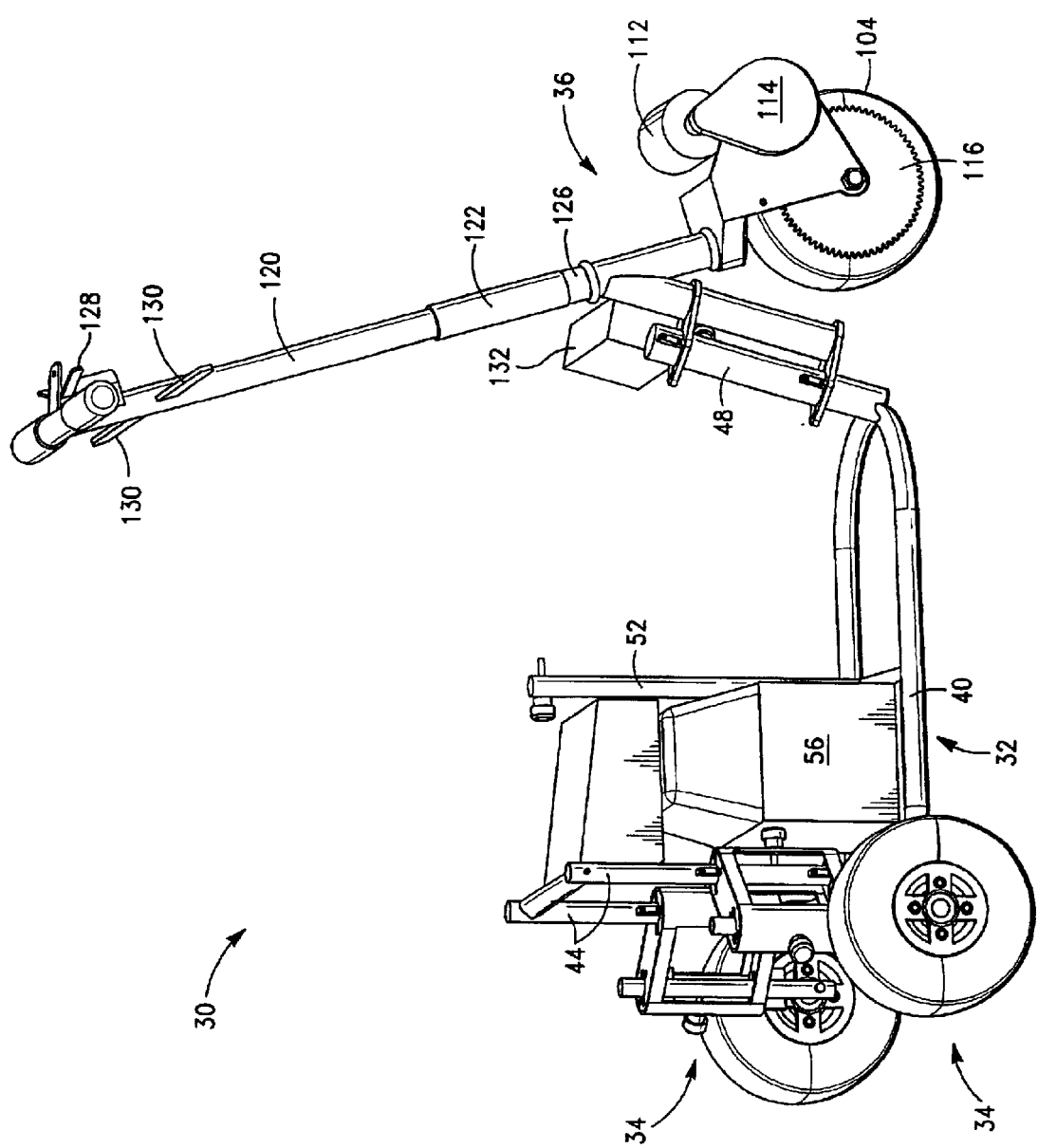
FIG. 6 is a perspective view of the collapsible vehicle of FIG. 1 showing a front wheel assembly and a steering column located in their respective deployed positions.

Referring to FIGS. 1 and 6, the vehicle of the present invention includes a front steerable wheel assembly 36. Although one front wheel assembly is shown, one should appreciate that one, two, three or more front wheel assemblies may be provided within the scope of the present invention. The front wheel assembly 36 is movable between a storage position which is within the periphery of the frame, as shown in FIG. 1, and a deployed position, as shown in FIG. 6.

Figure 7:
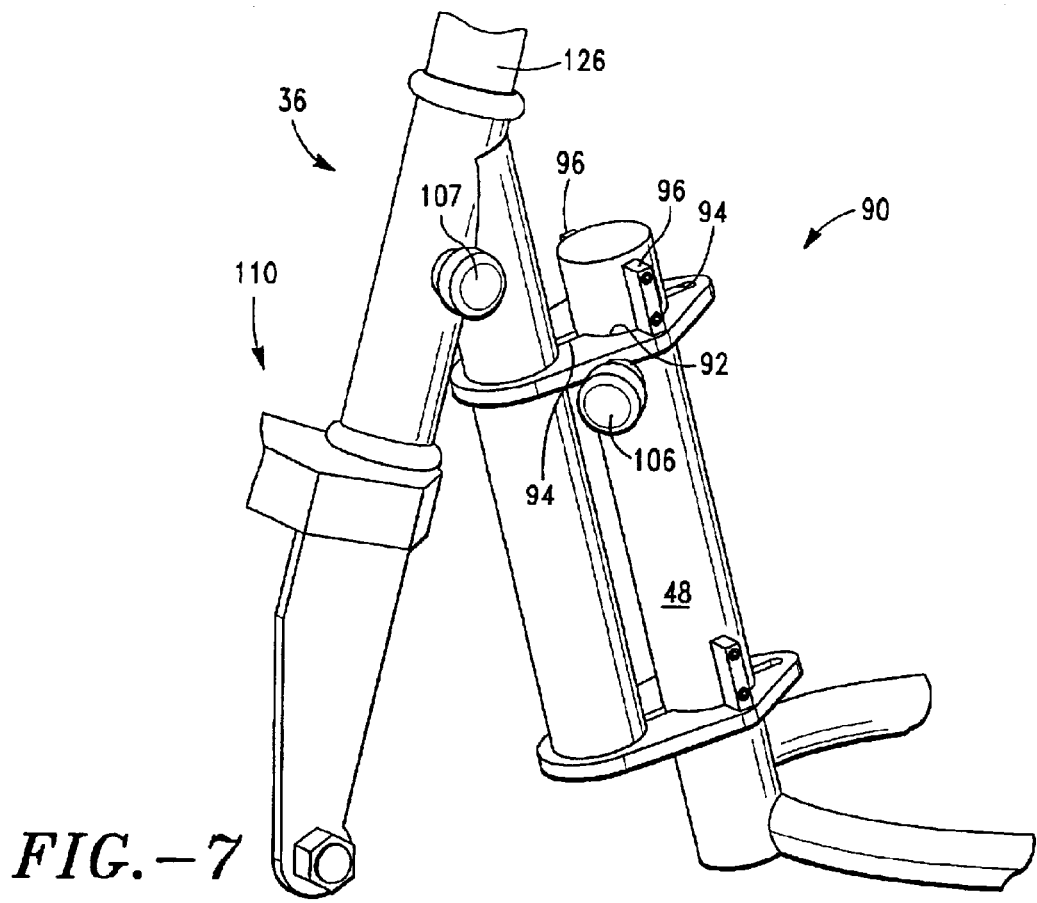
FIG. 7 is an enlarged fragmented view of the front wheel assembly of FIG. 6.

As shown in FIG. 7, the front wheel assembly 36 includes a front or second indexing member 90 which is pivotally and slidably mounted on the steering member 48. The front indexing member 90 has a third bore 92 receiving the steering member and a plurality of slots radially extending from the third or front bore 92. A pair of third or front passage slots 94 allows the front indexing member 90 to slide along the steering member 48 past a pair of third or front keys 96 located on the steering member 48 during initial assembly of the frame 32 of the collapsible vehicle 30.

Figure 8:
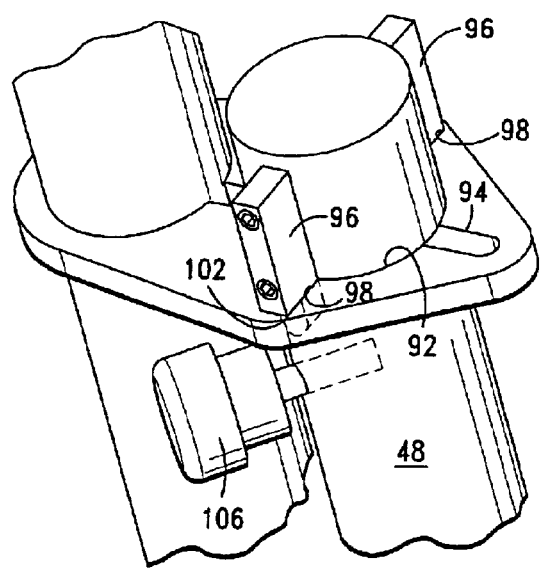
FIG. 8 is an enlarged fragmented view of an indexing member of the front wheel assembly of FIG. 7.

Referring to FIGS. 7 and 8, the front indexing member 90 also includes a pair of third or front shorter slots 98 which radially extend from the third bore 92. As the front indexing member 90 rotates below the third keys 96, the front indexing member 90 may be aligned such that the shorter slots 98 align with the third keys 96. Because the third slots 98 are shorter than the third keys 96, the front indexing member 90 engages a third or front shoulder 102 which is located on the bottom of each third key 96. This configuration allows the third keys 96 to support the weight of the collapsible vehicle 30 and a user when the front wheel 104 (FIG. 6) is located in its deployed position.

The front indexing member 90 also includes a third or front locking pin assembly 106 for locking the front wheel assembly 36 relative to the frame 32 when the front wheel 104 is located in its storage position. A fourth or steering column locking pin assembly 107 is also provided for locking a steering column 108 relative to the front wheel assembly 36 when the front wheel 104 is locked in its storage position. Alternatively, a set screw, cotter pin, or other suitable means may be provided to lock the front wheel assembly in its storage position. Similar to the locking pin assemblies discussed above, the third locking pin assembly 106 does not support the weight of the collapsible vehicle and user when the vehicle is in use. The weight of the vehicle and the user are instead supported by third keys 96. One should appreciate, however, that steering member 48 may alternatively be provided with third indexing holes instead of keys 96 in which case the third locking pin assembly 106 locks the front wheel assembly 36 relative to the frame 32 in both its deployed position and its storage position and supports the weight of the vehicle and a user when the vehicle is in use.

As shown in FIG. 6, the front wheel assembly includes a fork member rotatably supporting the front steerable wheel. The fork member 110 also supports a motor 112 and a corresponding transmission 114 for driving the front steerable wheel 104. The transmission includes a driving chain (not shown) operably connecting a driving sprocket (not shown) driven by the motor 112 and a driven sprocket 116 rotatably fixed to the front wheel. Alternatively, the transmission may include a transmission belt, a drive shaft, a gear assembly, or other suitable means for imparting rotational power from the motor to the front wheel. One should appreciate that the rear wheels of the collapsible vehicle may be configured as steering and/or drive wheels and fall withing the scope of the present invention.

Referring to FIG. 1, the front wheel assembly 36 includes steering column 108 having an articulated joint 118 allowing the steering column 108 to fold from a storage position to a deployed position. An upper steering post 120 folds against the motor 112 and transmission 114 and lies generally within the periphery of the frame 32 when the steering column 108 is in the storage position, as shown in FIG. 1. The upper steering post 120 is extended to its deployed position, as shown in FIG. 6, when the front wheel assembly 36 is moved to its deployed position. A threaded sleeve 122 is slidably mounted on the steering column 108 and includes internal threads (not shown) at a lower portion thereof which cooperate with external threads 124 located on the lower steering post 126, as shown in FIG. 1. The threaded sleeve 122 is slid down over the articulated joint 118 once the steering column 108 is moved to its deployed position and coaxially locks the upper steering post 120 with respect to the lower steering post 126.

As noted above, the steering member 48 preferably extends at an inclined angle of approximately 15° from vertical, that is approximately 75° with respect to the base plane and longitudinal members. This inclined angle provides clearance between the front wheel assembly 36 and the longitudinal members 40 as the front wheel assembly 36 pivots about the steering member 48 from its deployed position to its storage position. In particular, the inclined angle allows the front wheel 104 to move from a deployed position extending below longitudinal members 40, as shown in FIG. 6, to a storage position above longitudinal members 40, as shown in FIG. 3, as the front wheel assembly 36 pivots about the steering member 48. Furthermore, the inclined angle effectively positions the wheel 104, motor 112, and other components of the front wheel assembly relatively within the periphery of the frame 32 when the front wheel assembly 36 is in its storage position. This arrangement also allows the positioning of the steering column 108 substantially within the periphery of the frame when the vehicle 30 is in the collapsed configuration. One should appreciate that actual angle may vary in accordance with the actual dimensions of the vehicle provided that the resulting configuration allows suitable clearance between the front wheel assembly 36 and the longitudinal members 40 as the front wheel assembly pivots about steering member 48.

As shown in FIG. 6, a throttle lever 128 is mounted on an upper portion of the upper steering post 120. The throttle lever 128 allows the user to control both driving speed and direction of the collapsible vehicle 30 while the user is gripping the steering column 108. Carrying bag mounting tabs 130 are provided on the upper steering post 120 adjacent to and below the throttle lever 128. An ear 129 is also provided on the upper steering post 120 adjacent to and above the throttle lever 128. Ear 129 cooperates with a seat post latch pin assembly 160 to lock the steering column 108 in place when front wheel assembly 36 is in its storage position. An individual may utilize the steering column as a handle to carry and transport the collapsible vehicle 30 in its collapsed configuration when seat post latch pin assembly 160 engages ear 129, as is shown in FIG. 1.

The throttle lever 128 is operably connected to a drive control system 132 which regulates the energy supplied from the battery 56 to the motor 112. The drive control system 132 is electrically interconnected to the battery 56, throttle lever 128, and motor 112 by means of modular wire connectors (not shown) in a well known manner. The modular wire connectors allow the components, namely the battery 56 and throttle lever 128, to be disconnected from the drive control system 132 when the collapsible vehicle 30 is collapsed to the storage configuration.

Figure 9:
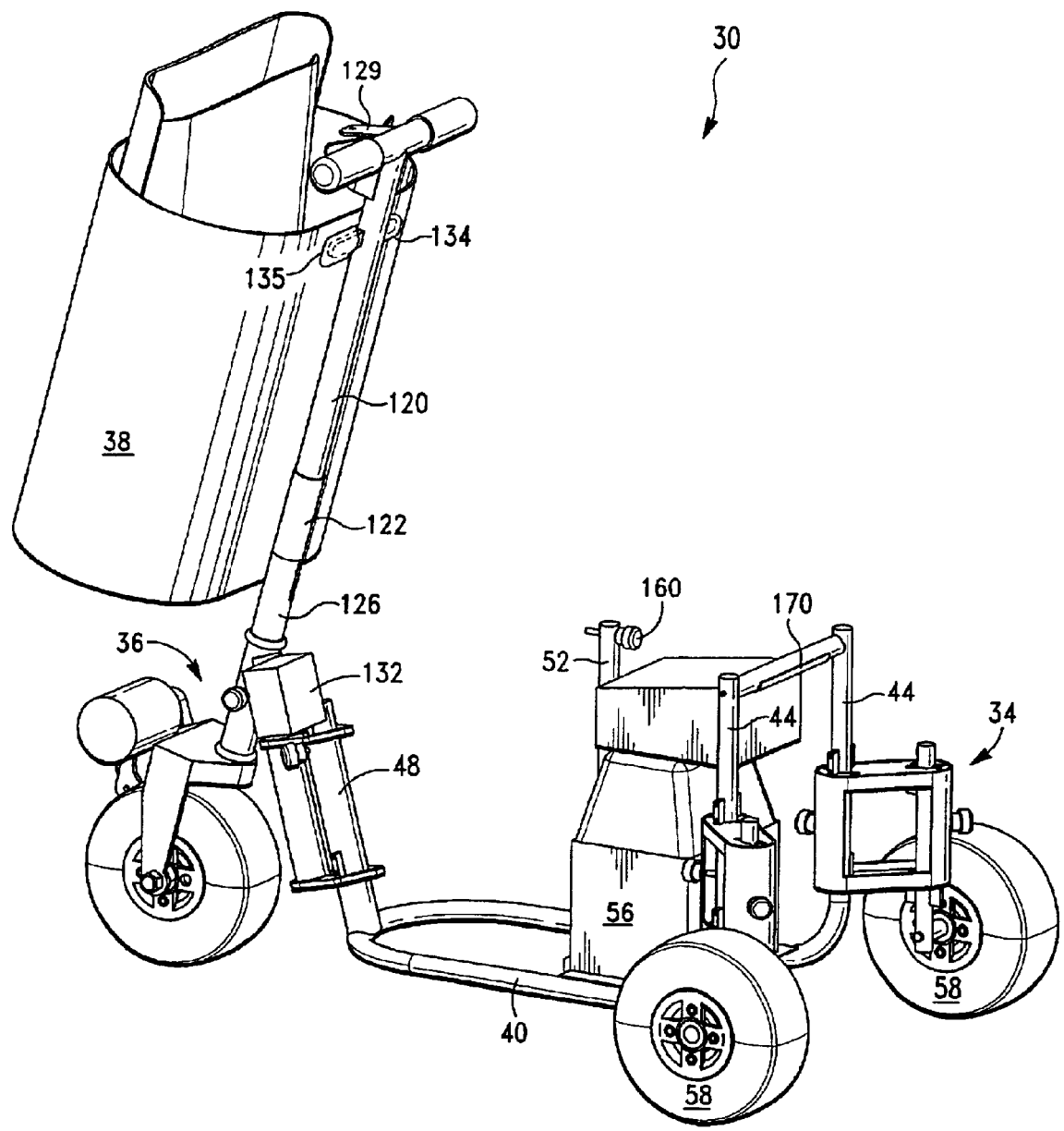
FIG. 9 is a perspective view of the collapsible vehicle of FIG. 1 showing a carrying bag with a seat and floor board mounted within.

As shown in FIG. 9, the carrying bag 38 has a pair of pockets 134, 135 stitched in a rear wall thereof to receive respective ones of the carrying bag mounting tabs 130. One pocket 135 has a releasable VELCRO flap which allows a user to insert one mounting tab into the other pocket 134 and then secure the VELCRO flap of pocket 135 around the other mounting tab to secure the carrying bag to the upper steering post.

Figure 10:
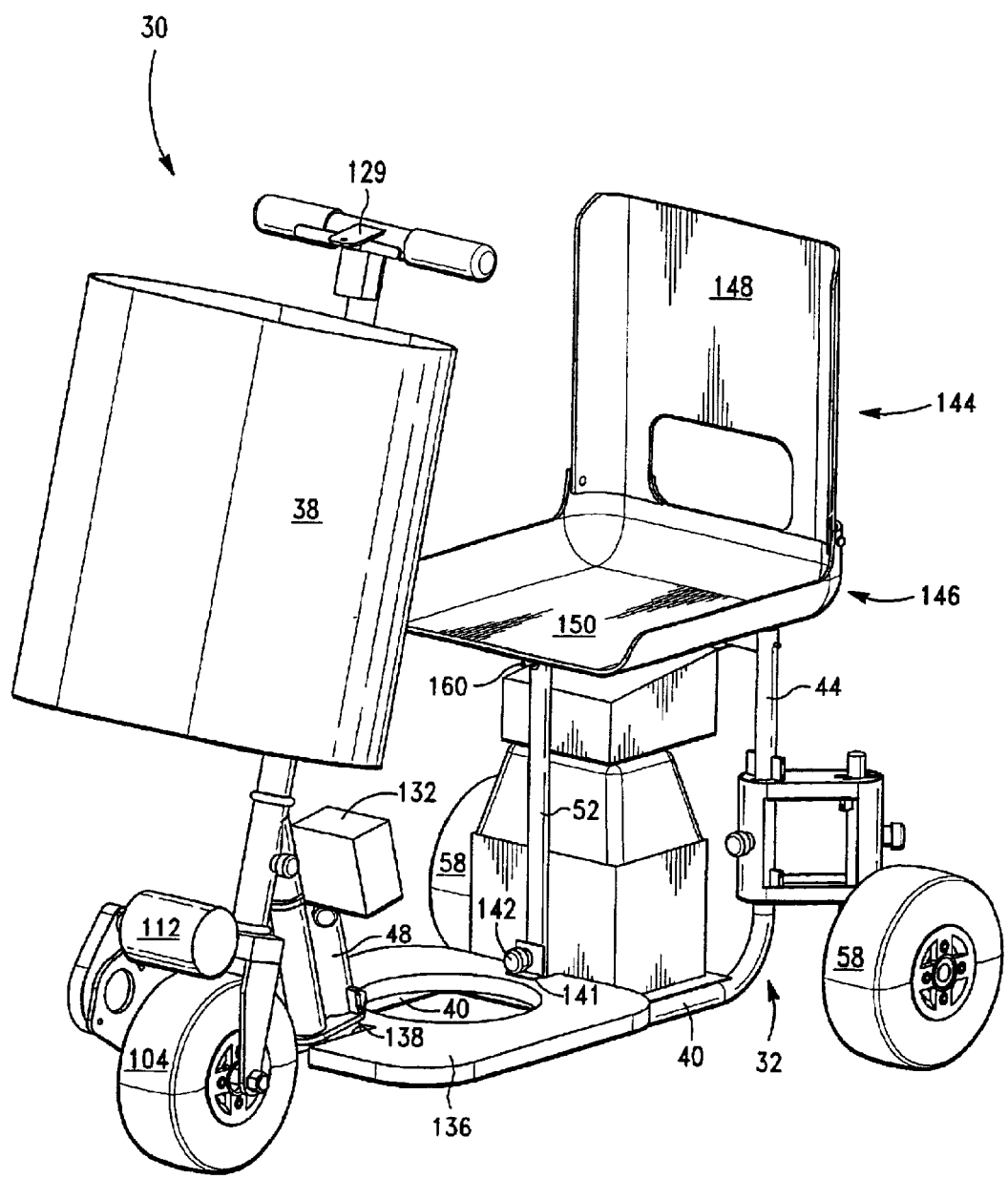
FIG. 10 is a perspective view of the collapsible vehicle of FIG. 1 showing a floorboard and a seat assembly mounted thereon.
Figure 11:
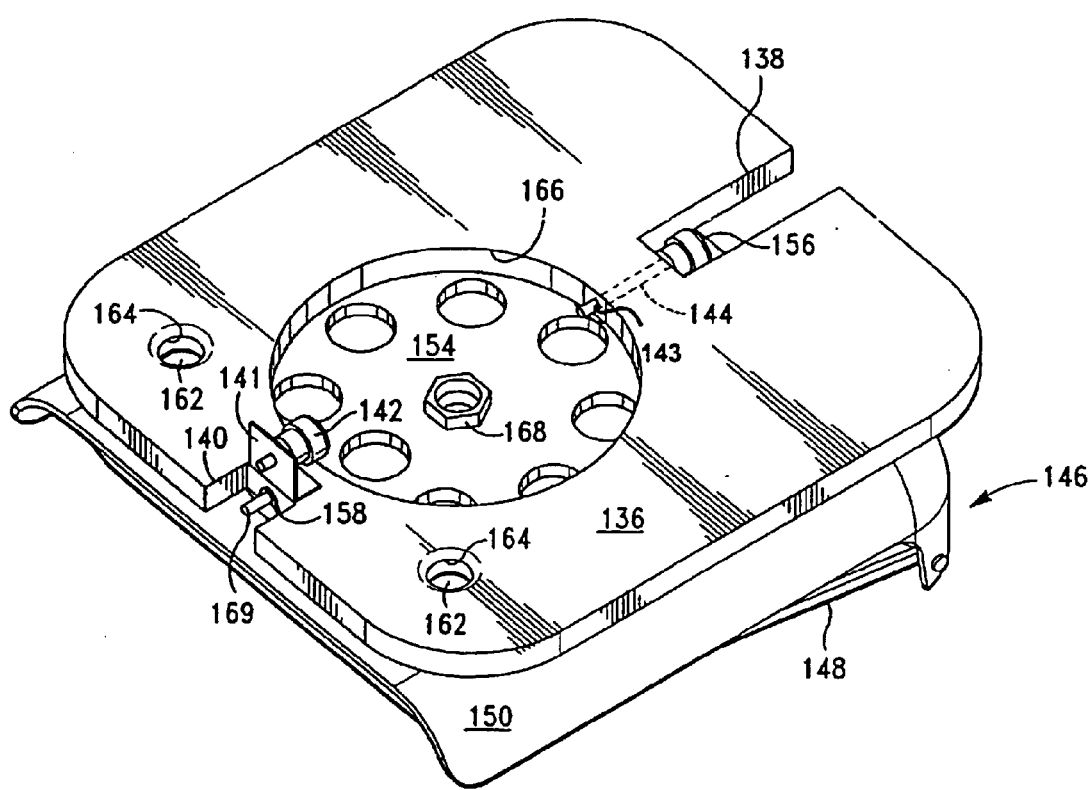
FIG. 11 is a detailed perspective view of the floorboard and seat assembly of FIG. 9 interlocked in a storage configuration.

A detachable floorboard 136 provides a platform upon which a user may rest their feet when operating the collapsible vehicle 30, as shown in FIG. 10. The floorboard 136 includes a forwardly extending slot 138 and a rearwardly extending slot 140 shaped to provide clearance for the steering member 48 and the seat post 52 of the frame, respectively, when the floorboard 136 is installed on the frame 32. The floorboard 136 includes a floorboard locking pin assembly 142 mounted on an L-bracket 141, as shown in FIG. 11, for engaging with a locking hole 145 located on the frame adjacent to the lower end of the seat post 52 (FIG. 4). The floorboard may also include a pilot hole 143 for engaging with a protrusion (not shown) located on a lower end of the steering member 48. The floorboard 136 also includes a pair of side guides (not shown) which extend perpendicularly from the bottom surface of the floorboard 136 to abut against the longitudinal members 40 of the frame 32 to transversely position the floorboard 136 with respect to the frame 32. Together, these components position and releasably secure the floorboard 136 to the frame 32.

Referring to FIG. 10, a detachable and folding seat assembly 144 supports a user in a driving position. The seat assembly 144 includes a folding seat 146 and a swivel assembly (not shown in FIG. 10). The folding seat 146 includes a seat back 148 which selectively folds against a seat bottom 150 allowing for a compact storage configuration, as is shown in FIGS. 1 and 11. The swivel assembly includes an upper seat swivel plate (not shown) rotatably attached to a lower seat swivel plate 154. Accordingly, the folding seat 146 selectively rotates with respect to the frame 32 when it is installed on the frame 32 and allows easy access for a user when sitting down on and standing up from the collapsible vehicle 30.

The folding seat 146 is rigidly mounted to the upper seat swivel plate by an adhesive, threaded fasteners, or other suitable means. The lower seat swivel plate 154 includes a spring loaded rear seat latch pin 156, a pilot hole 158 for cooperating with a spring loaded front seat latch pin assembly 160 mounted adjacent to an upper end of the seat post 52, and a pair of rear mounting pilot protrusions 162 for insertion into upper ends of the upright members 44. Together, these components position and releasably secure the lower seat swivel plate 154 to the frame 32.

The seat assembly 144 and the floorboard 136 are configured to releasably secure with one another to provide ease of handling when the collapsible vehicle 30 is in the storage or collapsible configuration. The seat assembly 144 and floorboard 136 may be conveniently secured to one another, as shown in FIG. 11 and stored in the carrying bag 38, as shown in FIG. 1. As shown in FIG. 11, the floorboard 136 includes pilot holes 164 for receiving the protrusions 162 located on the lower swivel plate 154 of the seat assembly 144. The floorboard 136 also includes an aperture 166 which conveniently provides clearance for a pivot assembly nut 168 of the swivel assembly. The spring loaded rear seat latch pin 156 and seat pilot hole 158 cooperate with the pilot hole 143 and positioning pin 169 of the floorboard 136, respectively, to releasably secure the seat assembly 144 and the floorboard 136 together.

A single user can easily lift and move the collapsible vehicle in its storage configuration due to the compact dimensions thereof. Furthermore, the handling weight of the collapsible vehicle in its storage position is significantly reduced because the battery, seat and floorboard are conveniently stored and carried in a separate carrying bag. A single user can also easily convert the collapsible vehicle from its storage or collapsible configuration to its use configuration without the need for tools or the assistance of another person.

In operation, the collapsible vehicle 30 may be transported easily from one location to another by means of an automobile, sport-utility vehicle or public transport, including buses, trains, ferries and airplanes, when in its storage or collapsible configuration, as shown in FIG. 1. A user may lift and carry the collapsible vehicle by grasping steering column 108 which is rigidly secured in place as discussed above. A user pivots the rear wheel assemblies 34 from their storage positions within the periphery of the frame 32 to their intermediate positions as shown in FIG. 2. The user then slides the rear wheel assemblies 34 from their intermediate positions to their deployed positions outside the periphery of the frame 32 and extending below the base plane of the frame 32, that is below the floorboard (not shown in FIG. 1) and longitudinal members 40 of the frame, as shown in FIG. 3.

Next, the user pivots the upper steering post 120 about the articulated joint 118 from its storage position, as shown in FIG. 3, and locks the upper steering post 120 coaxially with respect to the lower steering post 126, as shown in FIG. 6, by threadably engaging the threaded collar 122 to the lower steering post 126. The throttle lever 128 is electrically connected to the drive control system 132 by means of releasable modular wire connectors (not shown).

The user then pivots the steering wheel assembly 36 from its storage position within the periphery of the frame 32, as shown in FIG. 3, to its deployed position outside the periphery of the frame and extending below the base plane, that is below longitudinal members 40, as shown in FIG. 6.

The user then removes the battery 56 from the carrying bag and mounts it on the frame by securing it to the battery box 54, as shown in FIG. 6. The battery 56 is electrically connected to the drive control system 132 by means of releasable modular wire connectors (not shown).

The user next inserts one of the carrying bag mounting tabs 130 into one mounting pocket 134 located on the carrying bag and secures the VELCRO of the other mounting pocket 135 around the other mounting tab to secure the carrying bag to the steering column, as shown in FIG. 9. The seat assembly 144 and floorboard 136 are then removed from the carrying bag 38 and disengaged from one another.

As shown in FIG. 10, the floorboard 136 is positioned on the longitudinal members 40 of the frame 32 such that the forwardly extending slot 138 receives the steering member 48 and the rearwardly extending slot 140 receives the seat post 52. The locking pin and the pilot hole (FIG. 11) engage with the corresponding ear (not shown) and protrusion (not shown) located on the frame 32 to releasably engage the floorboard 136 to the frame 32, as is shown in FIG. 10.

Referring generally to FIGS. 10 and 11, the seat assembly 144 is aligned for installation by aligning the mounting protrusions 162 located on the lower swivel plate 154 with the upper ends of upright members 44. Next, with reference to FIGS. 9 and 10, the spring loaded rear seat latch pin 156 engages with a rear seat pilot hole 170 on the frame 32 and the spring loaded front seat latch pin assembly 160 mounted on the seat post 52 engages with the front seat pilot hole 158 to releasably engage the seat assembly 144 to the frame 32. The collapsible vehicle 30 is now ready for use by a user.

One should appreciate that the collapsible vehicle need not be assembled in the exact order described above. For example, the battery may be installed after the seat assembly. One should also appreciate that the collapsible vehicle may be collapsed to its storage or collapsed configuration by substantially reversing the order of steps discussed above.

Figure 12:
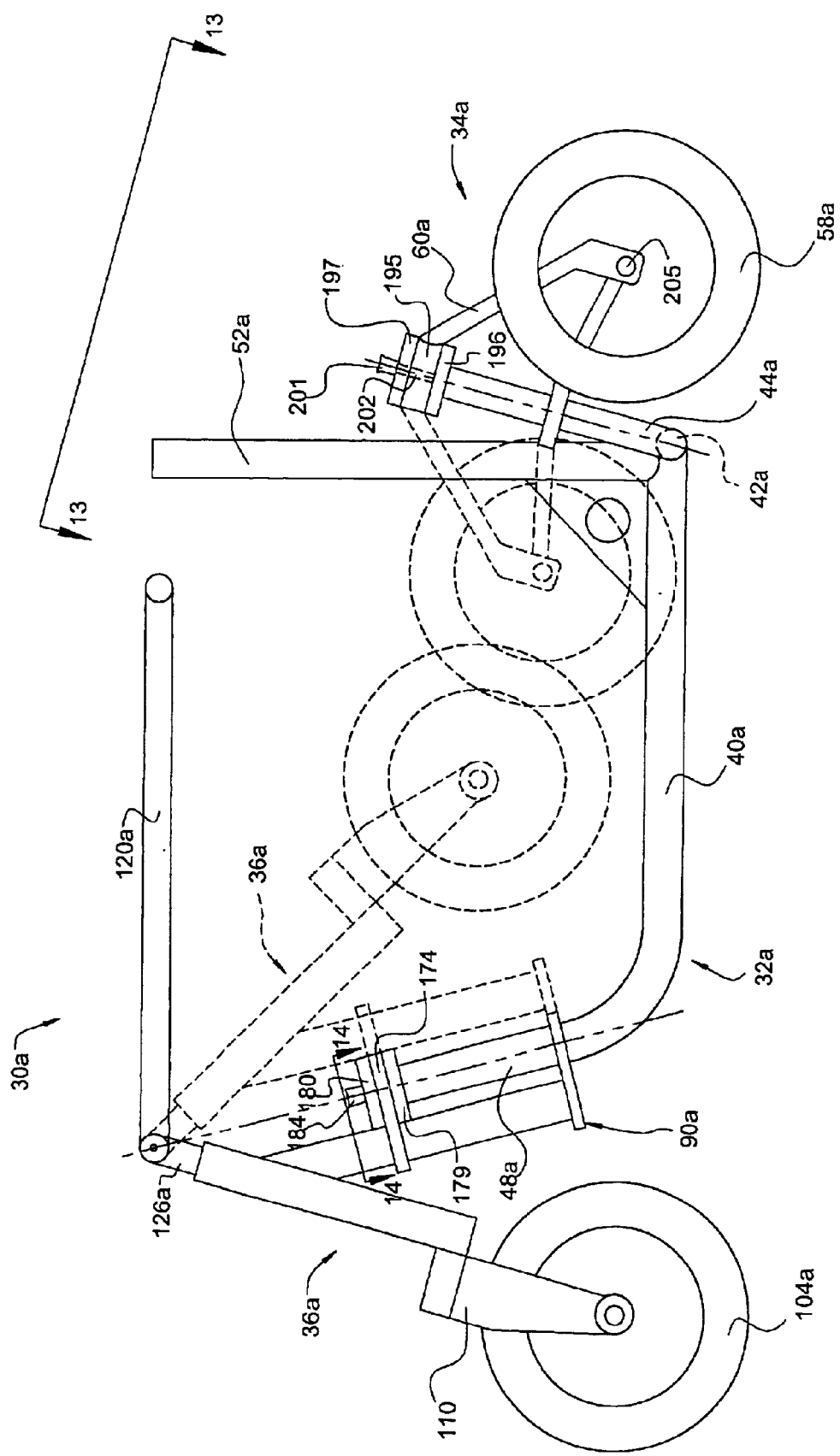
FIG. 12 is a schematic side view of a collapsible vehicle having a modified frame in accordance with the present invention, the wheels shown in their respective deployed positions with their respective storage positions shown in phantom.
Figure 13:
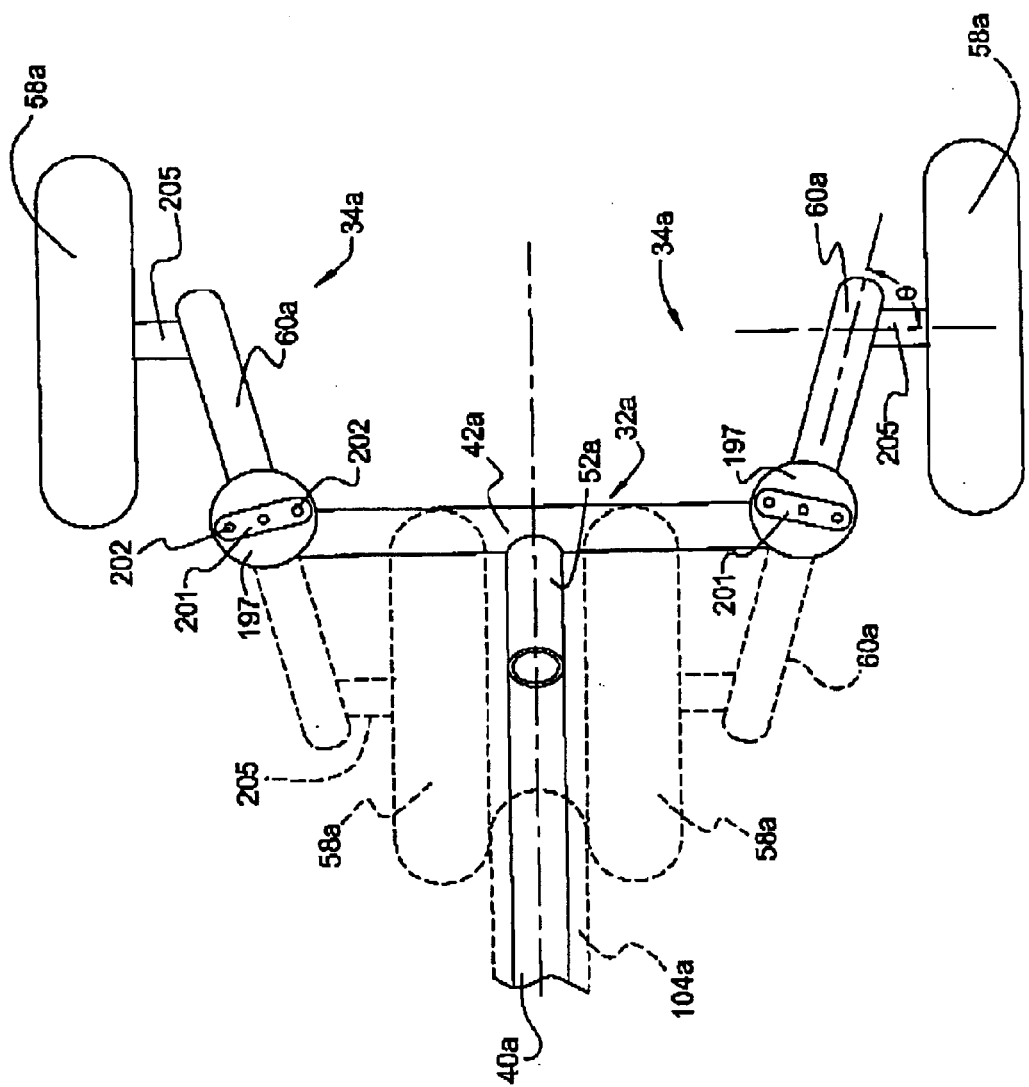
FIG. 13 is a fragmented schematic top view of the collapsible vehicle of FIG. 12 taken along line 13—13 in FIG. 12, the wheels shown in their respective deployed positions with their respective storage positions shown in phantom.
Figure 14:
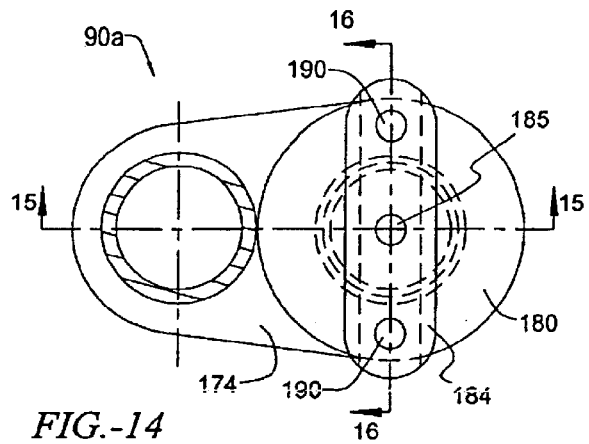
FIG. 14 is an enlarged cross-sectional view of an indexing member of the collapsible vehicle of FIG. 12 taken along line 14—14 in FIG. 12.

In another embodiment of the present invention, collapsible vehicle 30*a* is similar to collapsible vehicle 30 described above but includes a simplified frame configuration as shown in FIGS. 12 and 13. Like reference numerals have been used to describe like components of collapsible vehicle 30*a* and collapsible vehicle 30.

Frame 32*a* includes a single longitudinal member 40*a* and a single transverse member 42*a*. An upright member 44*a* extends upwardly from each end of transverse member 42*a*. Steering member 48*a* extends upwardly from a forward end 50*a* of longitudinal member 40*a*. A seat post 52*a* extends upwardly from the rearward end of longitudinal member 40*a* adjacent transverse member 42*a* and intermediate upright members 44*a*. Although seat post 52*a* is shown to be substantially vertical or perpendicular to the longitudinal member, one should appreciate that the seat post may extend at an inclined angle with respect to the longitudinal members and fall within the scope of the present invention.

The frame has a substantially triangular-shaped periphery. In particular, the longitudinal member 40*a* and transverse member 42a collectively define a base plane extending therethrough, and more particularly, a generally triangular base which is substantially smaller than the track and wheelbase of the vehicle. Upright members 44a and steering member 48a, extend upward forming the points of the triangular base and defining the depth of the triangular-shaped periphery. As the vehicle of the present invention collapses into a configuration suitable for storage and transporting, all wheels of the vehicle are moved to a respective storage position which is located substantially within the periphery of frame 32a and above the base plane. Namely, the wheels are moved within the external confines of the extremes of the frame 32a. As collapsible vehicle 30a is converted to an extended, ready-for-use configuration, the wheels are moved from their storage positions to respective deployed positions outside of the frame periphery and extend below the base plane in a manner similar to collapsible vehicle 30 discussed above.

Referring to FIGS. 12 and 13, the collapsible vehicle 30a includes a front steerable wheel assembly 36a and a pair of rear non-steerable wheel assemblies 34a. Each rear wheel assembly is movable between a storage position which is within the periphery of frame 32a, as shown in phantom, and a deployed position.

Figure 15:
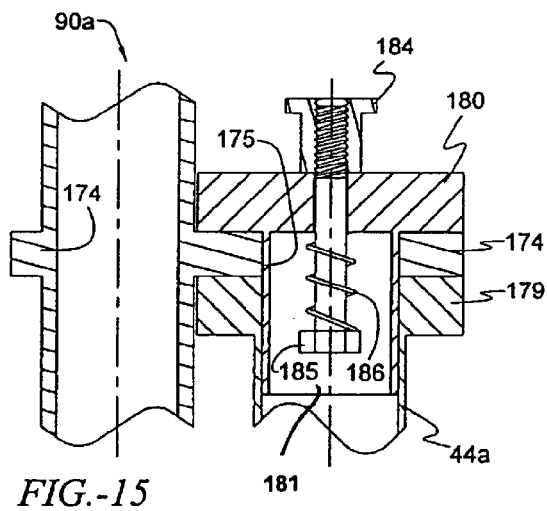
FIG. 15 is an enlarged cross-sectional view of the indexing member of the collapsible vehicle of FIG. 12 taken along line 15—15 in FIG. 14.

Front wheel assembly 36a includes a front indexing member 90a which is pivotally mounted on a steering member 48a. The front indexing member 90a includes steering flange 174 having a bore 175 receiving steering member 48a, as shown in FIG. 15. In the illustrated embodiment, the range of downward axial movement of front indexing member 90a along the steering member 48a is limited by an end collar 179 affixed to an upper end of steering member 48a. End collar member 179 is integral with the upper end of steering member 48a and is preferably welded thereto. One should appreciate that other means can be utilized to affix the collar member to the upright member including, but not limited to, adhering, threading, or generally affixing the collar to the upright member.

The range of upward axial movement of front indexing member 90a along steering member 48a is limited by an end cap 180, as shown in FIG. 15. End cap 180 includes a sleeve 181 which extends through bore 175 of steering flange 174 and into tubular member 48a to releasably and pivotally secure front indexing member 90a to steering member 48a. In one embodiment, sleeve 181 is threadably fastened to the end of steering member 48a in a well known manner. This configuration allows easy assembly and removal of front wheel assembly 36a from the frame 32a. One should appreciate that other means can be used to releasably secure the end cap to the steering member. For example, an expanding plug assembly, locking pins, or threaded fasteners can be used to secure sleeve 181 within tubular steering member 48a in a conventional manner.

Front indexing member 90a also includes a front securing knob 184 coupled with end cap 180 in order to provide a means to pivotally secure steering flange 174 with respect to end cap 180 thereby pivotally securing front indexing member 90a and, in turn, front wheel assembly 36a in either its deployed position or its storage position.

Figure 16:
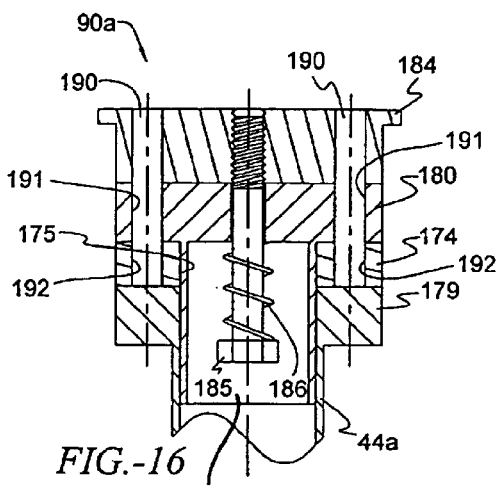
FIG. 16 is an enlarged cross-sectional view of the indexing member of the collapsible vehicle of FIG. 12 taken along line 16—16 in FIG. 14.

Front securing knob 184 is biased against end cap 180 such that it is biased toward a secured position, as most clearly shown in FIG. 16. Securing knob 184 includes a threaded fastener 185 which extends through a bore in end cap 180. A biasing member in the form of a spring 186 biases threaded fastener 185 downwardly thereby biasing securing knob toward the secured position. One should appreciate that other means can be used to operably attach and bias securing knob to the end cap in accordance with the present invention.

It is noted that end cap 180 supports the entire weight of the collapsible vehicle and a user when front wheels 104a is located in their deployed position instead of the securing knob assembly. Thus, the securing knob assembly of the illustrated embodiment does not carry any load of the collapsible vehicle and a user when the front wheel is located in its deployed position.

Securing knob 184 also includes a pair of downwardly extending securing protrusions 190. In the illustrated embodiment, the protrusions take the form of a pair of pins, however, one should appreciate that one, two, three or more pins can be used. One should also appreciate that other protrusions can be utilized within the scope of the present invention. For example, the securing knob can be provided with a downwardly extending a tongue which would cooperate with a complementary groove in the upper surface of the end cap. Alternatively, the knob can be provided with a downwardly extending spline which would cooperate with a complementary recess in the end cap.

When securing knob 184 is in the secured position, pins or protrusions 190 extend downwardly therefrom through a pair of complementary and diametrically spaced anchor bores 191 of end cap 180 and into a pair of diametrically spaced securing bores 192 of steering flange 174, as shown in FIG. 16. As the bores are diametrically spaced, securing knob 184 can be used to pivotally secure front wheel assembly 36a in two positions 180° apart from one another, namely, the storage and deployed positions. A user simply pulls securing knob 184 away from end cap 180 to overcome the force of spring 186 and disengage steering flange 174 in order to allow front wheel assembly 90a to move between its storage and deployed positions.

Turning now to the rear wheel assemblies, each rear wheel assembly 34a includes a rear indexing member 60a which is pivotally mounted on a respective upright member 44a in the same manner that front indexing member 90a is pivotally mounted on steering member 48a. As shown in FIG. 12, rear indexing member 60a includes suspension flange 195 having a bore receiving upright member 44a in a similar manner as steering flange 174 receives steering member 48a. In the illustrated embodiment, the range of downward axial movement of the rear indexing member 60a along the upright member 44a is limited by a collar 196 affixed to an upper end of upright member 44a, as shown in FIG. 12.

An end cap 197 extends through the bore of suspension flange 195 in the same manner as end cap 180 extends through bore 175 of steering flange 174. End cap 197 releasably secures rear indexing member 60a to upright member 44a.

Rear indexing member 60a also includes a rear securing knob 201, which is equivalent to knob 184 on the steering assembly, and is coupled with end cap 180 in order to provide a means to pivotally secure suspension flange 195 with respect to rear end cap 197 thereby pivotally securing rear indexing member 60a and, in turn, rear wheel assembly 34a in either its deployed position or its storage position, as shown in phantom in FIG. 12.

Rear securing knob 201 is biased against end cap 180 such that it is biased toward a secured position in a similar manner as front securing knob 184 above. Rear end cap 197 supports the entire weight of the collapsible vehicle and a user when front wheels 58a are located in their deployed position and not securing knob 201. Thus, the securing knob assembly of the illustrated embodiment does not carry any load of the collapsible vehicle and a user when the front wheel is located in its deployed position. Rear securing knob 201 also includes a pair of downwardly extending securing protrusions or pins 202.

When rear securing knob 201 is in the secured position, pins 202 extend downwardly therefrom through a pair of complementary and diametrically spaced anchor bores of end cap 197 and into a pair of diametrically spaced securing bores of suspension flange 195, as shown in FIG. 12. The bores are diametrically spaced, rear securing knob 201 can be used to pivotally secure rear wheel assembly 34a in two positions 180° apart from one another, namely, the storage and deployed positions.

In the embodiment shown in FIGS. 12 and 13, rear wheel assemblies 34a include a rear wheel axle 205 rotatably supporting rear wheel 58a. Rear wheel axle is rigidly affixed to rear wheel assembly 60a at an acute angle θ, as most clearly shown in FIG. 13. This configuration allows wheel 58a to be significantly offset with respect to the ends of transverse member 42a and upright members 44a thereby providing collapsible vehicle 30a with a wider track, that is, a wider distance between the rear wheels, while providing very compact design when the wheels are in their storage positions.

Preferably, the acute angle is approximately 75°, however, one should appreciate that the angle can be varied in accordance with the present invention. For example, the angle can be decreased to provide a the collapsible vehicle with a wider track, that is a wider distance between the wheels.

As shown in FIG. 12, front wheel 104a overlaps rear wheels 58a when in their respective positions thus providing a very compact design. Front wheel 104a is partially sandwiched between rear wheels 58a as shown in FIG. 13. One should appreciate that the frame of the collapsible vehicle can be shortened whereby the overlap between the front wheel and the rear wheels increases and the overall longitudinal dimensions of the vehicle in the storage configuration decreases.

In operation and use, collapsible vehicle 30a is used in substantially the same manner as collapsible vehicle 30 discussed above. However, in this embodiment, a user need only pivot rear wheel assemblies 34a from their storage positions within the periphery of frame 32a to their deployed positions outside the periphery of frame 32a, as shown in FIG. 12. In this embodiment, there is no need for the user to slide the rear wheel assembly along the upright member, thus providing a simplified method of converting the collapsible vehicle between the storage configuration and the use configuration.

Figure 17:
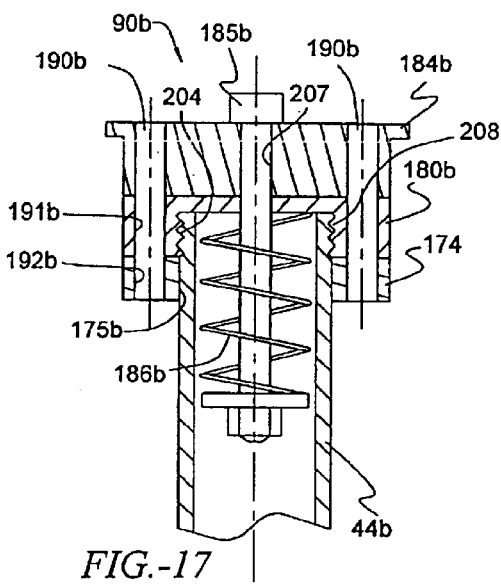
FIG. 17 is an enlarged cross-sectional view of an alternative indexing member similar to that shown in FIG. 16.

In another embodiment of the present invention, front indexing member 90b is similar to front indexing member 90a described above but includes a threaded end cap 180b as shown in FIG. 17. Like reference numerals have been used to describe like components of front indexing member 90b and front indexing member 90a.

Front indexing member 90b includes steering flange 174b having a bore 175b receiving upright member 44b of the steering member, as shown in FIG. 17. In the illustrated embodiment, the range of downward axial movement of front indexing member 90b along upright member 44b is limited by suitable means affixed to an upper end of upright member 44b. For example, a pin, tab, or flange can be rigidly affixed to the upper end of steering member 48b. However, one should appreciate that such means to prevent downward axial movement are not necessary to the operation of the present invention.

The range of upward axial movement of front indexing member 90b along steering member 48b is limited by an end cap 180b, as shown in FIG. 17. End cap 180b includes internal threads 204 which cooperate with external threads 208 located on the upper end of tubular member 48b to releasably and pivotally secure front indexing member 90b to steering member 48b. Preferably, one or more indexing screws may be used to positionally secure end cap 180b to steering member 48b. This configuration allows easy assembly and removal of front wheel assembly 36b from the frame 32b.

Front indexing member 90b also includes a front securing knob 184b coupled with end cap 180b in order to provide a means to pivotally secure steering flange 174b with respect to end cap 180b thereby pivotally securing front indexing member 90b and, in turn, the front wheel assembly in either its deployed position or its storage position.

Front securing knob 184b is biased against end cap 180b such that it is biased toward a secured position, as most clearly shown in FIG. 17. Securing knob 184b includes a threaded fastener 185b which extends through a bore 207 in end cap 180b. A biasing member in the form of a spring 186b biases threaded fastener 185b downwardly thereby biasing securing knob toward the secured position. One should appreciate that other means can be used to operably attach and bias securing knob to the end cap in accordance with the present invention.

It is noted that end cap 180b supports the entire weight of the collapsible vehicle and a user when front wheels 104b is located in their deployed position instead of the securing knob assembly. Thus, the securing knob assembly of the illustrated embodiment does not carry any load of the collapsible vehicle and a user when the front wheel is located in its deployed position.

In operation and use, front indexing member 90b is used in substantially the same manner as front indexing member 90a discussed above. A user need only pivot the wheel assemblies from their storage positions within the periphery of the frame to their deployed positions outside the periphery of the frame. In this embodiment, as with the preceding one, there is no need for the user to slide the wheel assembly along the respective member, thus providing a simplified method of converting the collapsible vehicle between the storage configuration and the use configuration. One should appreciate that the indexing member illustrated in FIG. 17 is equally suitable for use for either the front or rear wheel assemblies.

Figure 18:
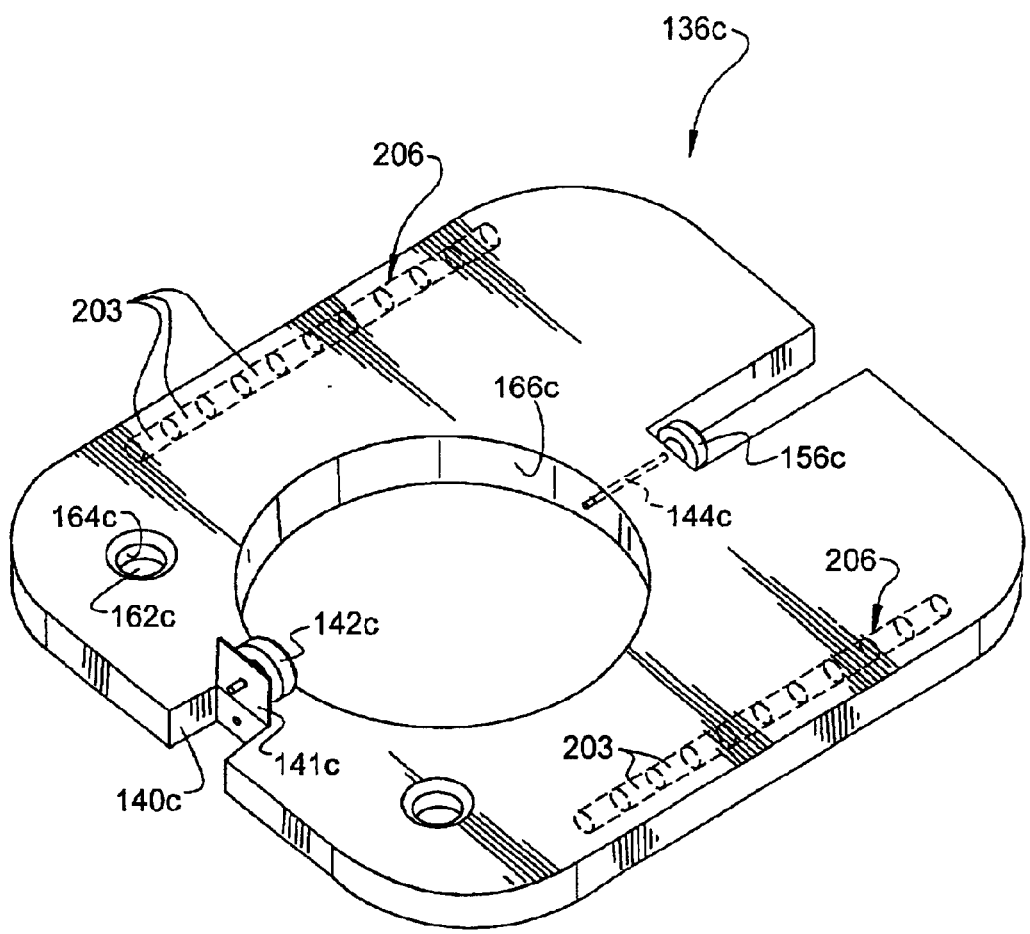
FIG. 18 is a perspective view of an alternative floorboard similar to that shown in FIG. 11.

In one embodiment of the present invention, the collapsible vehicle includes a floorboard 136c which is similar to floorboard 136 described above but incorporates batteries 203 therein as shown in FIG. 18. Again, like reference numerals have been used to describe like components.

A plurality of smaller batteries 203 may be used to power the vehicle instead of a small number of larger cells, for example, instead of battery 56 described above. One should appreciate, however, that the actual number of batteries used to power the vehicle will depend upon various factors including, but not limited to, the size and weight of the vehicle, the size and power of the motor.

Although the use of smaller batteries increases the number of batteries required to power the vehicle, such smaller batteries can be conveniently located on the vehicle. As shown in FIG. 18, batteries 203 are received within battery chambers 206 in a well known manner. Battery chambers 206 are located on floorboard 136c. One should appreciate that the number of battery chambers and locations thereof within or on the floorboard can vary widely in accordance with the present invention.

In operation and use, a collapsible vehicle incorporating floorboard 136c is used in substantially the same manner as the collapsible vehicles discussed above. The configuration of floorboard 136c, however, allows a user to simultaneously remove or install the batteries along with the floorboard, thus further simplifying conversion of the vehicle between its storage and in-use configurations.

For convenience in explanation and accurate definition in the appended claims, the terms "up" or "upper", "down" or "lower", "inside" and "outside" are used to describe features of the present invention with reference to the positions of such features as displayed in the figures.

In many respects the modifications of the various figures resemble those of preceding modifications and the same reference numerals followed by subscripts a and c designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A collapsible vehicle comprising:
    a frame defining a base having a periphery;
    a non-steerable wheel assembly having a non-steerable wheel pivotally mounted to said frame about an axis for movement between a storage position within the periphery of said frame to a deployed position laterally outside the periphery of said frame and extending below said base plane, wherein said axis is inclined with respect to said base plane; and
    a steerable wheel assembly having a steerable wheel and being movably mounted to said frame for movement between a storage position within the periphery of said frame to a deployed position outside the periphery of said frame and extending below said base plane.

2. A collapsible vehicle according to claim 1 wherein said steerable wheel is pivotally mourned to said frame by a steering axis inclined with respect to said base plane.

3. A collapsible vehicle according to claim 1 wherein said non-steerable wheel is rotatably mounted on an axle, said axle being rigidly affixed at an acute angle with respect to said non-steerable wheel assembly.

4. A collapsible vehicle according to claim 3 wherein said acute angle is approximately 75°.

5. A collapsible vehicle according to claim 1 wherein said frame includes a longitudinal member, a transverse member extending from said longitudinal member proximate a rear of said frame, and a pair of upright members proximal opposed ends of said transverse member, said non-steerable wheel assembly including a pair of non-steerable wheels, each of said non-steerable wheels being pivotable about a respective single axis formed by a pair of upright members provided proximal opposite ends of said transverse member, said non-steerable wheels each being pivotal on said upright members between a storage position within the periphery of said frame to a deployed position outside the periphery of said frame and each extending below said base plane.

6. A collapsible vehicle according to claim 5 wherein a portion of said steerable wheel longitudinally overlaps a respective portion of said non-steerable wheels when all said wheels are in their respective storage positions.

7. A collapsible vehicle according to claim 5 further comprising a suspension flange pivotally mounting said non-steerable wheel assembly to said frame and a first securing knob rotationally affixed wit respect to said upright members, wherein said first securing knob selectively engages said suspension flange to lock said non-steerable wheel assembly in said storage position and in said deployed position.

8. A collapsible vehicle according to claim 7 wherein said suspension flange includes a pair of diametrically opposed suspension apertures and said first securing knob includes a first protrusion, said first protrusion engaging one of said suspension apertures to secure said non-steerable wheel assembly in said storage position and said first protrusion engaging the other of said suspension apertures in said deployed position.

9. A collapsible vehicle according to claim 5 further comprising a steering flange pivotally mounting said steerable wheel assembly to said frame and a second securing knob rotationally affixed with respect to said upright members, wherein said second securing knob selectively engages said steering flange to lock said steerable wheel assembly in said storage position and in said deployed position.

10. A collapsible vehicle according to claim 9 wherein said steering flange includes a pair of diametrically opposed steering apertures and said second securing knob includes a second protrusion, said second protrusion engaging a one of said steering apertures to secure said Steerable wheel assembly in said storage position and said second protrusion engaging the other of said steering apertures in said deployed position.

11. A collapsible vehicle according to claim 1 in which said non-steerable wheel occupies a space when located in its storage position, said collapsible vehicle further comprising a motor drivingly engaged to said steerable wheel, a battery for supplying power to said motor, and a battery mount on said frame for mounting said battery in said space when said non-steerable wheel is located in its deployed position.

12. A collapsible vehicle according to claim 1 further comprising a motor drivingly connected to one of said steerable and non-steerable wheels.

13. A collapsible vehicle according to claim 1 further comprising a floorboard releasably engaging said frame, and a battery for providing power to said motor, said floorboard including a battery chamber housing said battery.

14. A collapsible vehicle comprising:
    a frame defining a base plane having a periphery;
    a non-steerable wheel assembly having a non-steerable wheel pivotally mounted to said frame about an axis for movement between a storage position within the periphery of said frame to a deployed position laterally outside the periphery of said frame and extending below said base plane; and
    a steerable wheel assembly having a steerable wheel and being movably mounted to said frame for movement between a storage position within the periphery of said frame to a deployed position outside the periphery of said frame and extending below said base plane;

wherein a portion of said steerable wheel longitudinally overlaps a portion of said non-steerable wheel when said wheels are in their respective side-by-side storage positions.

15. A collapsible vehicle comprising:

a frame defining a base plane having a periphery;

a non-steerable wheel assembly having a non-steerable wheel pivotally mounted to said frame about an axis for movement between a storage position within the periphery of said frame to a deployed position laterally outside the periphery of said frame and extending below said base plane;

a steerable wheel assembly having a steerable wheel and being movably mounted to said frame for movement between a storage position within the periphery of said frame to a deployed position outside the periphery of said frame and extending below said base plane; and a steering member having a steering axis which intersects said base plane, said steerable wheel assembly being pivotable about said steering axis to move said steerable wheel between a storage position within the periphery of said frame above said base plane and a deployed position outside the periphery of said frame and extending below said base plane.

16. A collapsible vehicle according to claim 15 wherein said steering axis is inclined with respect to said base plane.

17. A collapsible vehicle according to claim 15 wherein said steering axis is inclined approximately 75° with respect to said base plane.

18. A method of using a collapsible vehicle comprising the steps:

providing a collapsible vehicle including a frame defining a base plane, a non-steerable wheel assembly having a non-steerable wheel, and a steerable wheel assembly having a steerable wheel;

pivoting said non-steerable wheel about an axis inclined with respect to said base plane, from a storage position within the periphery of said frame to a deployed position laterally outside the periphery of said frame and extending below said base plane; and moving said steerable wheel assembly from a storage position within the periphery of said frame to a deployed position outside the periphery of said frame and extending below said base plane.

19. A method according to claim 18 further comprising a steering member baa a steering axis which intersects said base plane, and wherein said moving step is accomplished by pivoting said steerable wheel assembly about said steering axis from a storage position within the periphery of said frame above said base plane to a deployed position outside the periphery of said frame and extending below said base plane.

20. A method according to claim 19 wherein both said pivoting and moving steps are accomplished by pivoting about axes inclined with respect to said base plane.

21. A method according to claim 18 in which said collapsible vehicle further includes a motor drivingly engaged to one of said wheels, a battery for supplying power to said motor, and a floorboard releasably engaging said frame, said method further comprising the step of mounting said floorboard on said frame thereby simultaneously mounting said battery on said frame.

22. A method according claim 18 in which said collapsible vehicle further includes a suspension flange pivotally mounting said non-steerable wheel assembly to an upright member on said frame and a first securing knob rotationally affixed with respect to said upright member, said first securing knob having a first protrusion selectively engaging one of a pair of diametrically opposed suspension apertures in said suspension flange to secure said non-steerable wheel assembly in either said storage position or deployed position, said method further comprising the steps of:

pulling said first securing knob to disengage said first protrusion from one of said suspension apertures and pivoting said non-steerable wheel assembly about said upright member; and releasing said first securing knob and continuing to pivot said non-steerable wheel assembly until said first protrusion engages the other of said suspension apertures thereby securing said non-steerable wheel in either said storage position or said deployed position.

* * * * *